United States Patent [19]
Matsumoto

[11] Patent Number: 6,103,349
[45] Date of Patent: Aug. 15, 2000

[54] BELT

[75] Inventor: Hideki Matsumoto, Kobe, Japan

[73] Assignee: Bando Chemical Industries, Ltd., Kobe, Japan

[21] Appl. No.: 09/024,408

[22] Filed: Feb. 17, 1998

[30] Foreign Application Priority Data

Feb. 18, 1997 [JP] Japan ..................................... 9-033600

[51] Int. Cl.$^7$ ............................. B32B 23/02; F16G 5/00
[52] U.S. Cl. ......................... 428/192; 428/167; 428/187; 474/237; 474/265; 198/502.1
[58] Field of Search ..................................... 428/167, 192, 428/187, 141; 474/237, 265, 242; 198/502.2, 847, 502.1

[56] References Cited

U.S. PATENT DOCUMENTS

| | | | |
|---|---|---|---|
| 4,093,694 | 6/1978 | Browning | 464/246 |
| 5,244,080 | 9/1993 | Bierbaum | 198/502.1 |
| 5,298,100 | 3/1994 | Franchin et al. | 156/238 |
| 5,714,024 | 2/1998 | Tomiyama et al. | 156/137 |

FOREIGN PATENT DOCUMENTS

| | | |
|---|---|---|
| 0 034 225 | 8/1981 | European Pat. Off. |
| 0 249 404 | 12/1987 | European Pat. Off. |
| 0 487 016 | 5/1992 | European Pat. Off. |
| 0 714 757 | 6/1996 | European Pat. Off. |
| 5-104654 | 4/1993 | Japan |
| 6-337038 | 12/1994 | Japan |
| 8-152048 | 6/1996 | Japan |
| 8-281828 | 10/1996 | Japan |

OTHER PUBLICATIONS

Patent Abstracts of Japan, vol. 014, No. 416 (M–1021), Sep. 7, 1990 & JP 02 160578 A (Yunitsuta KK), Jun. 20, 1990.

*Primary Examiner*—Donald Loney
*Attorney, Agent, or Firm*—Nixon Peabody LLP; Thomas W. Cole

[57] ABSTRACT

In a V-ribbed belt used in a manner of bringing the back face as well as the bottom face into contact with pulleys, a hiding layer for hiding the texture of the belt is formed on a part of the side faces of the belt body, and a mark indicating the history of belt manufacturing is provided on the hiding layer. This prevents the occurrence of inconveniences resulting from the formation of the mark on the belt back face and keeps the mark recognizable for a long time.

11 Claims, 4 Drawing Sheets

BELT

BACKGROUND OF THE INVENTION

This invention relates to a belt, for example, a power transmission belt such as a V-ribbed belt or a transfer belt such as a flat belt, used in a manner that a part of the belt surfaces is brought into contact with pulleys, and particularly relates to improvements in the placement of a mark provided on a surface of the belt for indicating the history of belt manufacturing.

Conventionally, in order to drive auxiliaries or the like, of an automobile engine, there is known a technique that a rotational force of a crank shaft of the engine is transmitted to each of the auxiliaries through a V-ribbed belt as shown in FIG. 7. The V-ribbed belt is so composed that a plurality of ribs a, a, . . . extending along the length of the belt are formed in parallel with each other in a belt widthwise direction on the bottom face of the belt as an inner periphery of the belt (lower face side of the figure). In other words, the V-ribbed belt wound around a plurality of pulleys brings the bottom face thereof into contact with each of the pulleys so that power transmission is accomplished by friction between the belt and each pulley.

On the back face of the above-mentioned V-ribbed belt (upper face side of the figure), there is provided a mark b indicating the history of belt manufacturing such as a manufacturer and a lot number when the belt was manufactured. For the formation of such a mark b, there is a typical method of using a transfer mark material formed such that a mark layer is provided on one surface of a base material. In detail, the transfer mark material is put on the belt back face so as to bring the mark layer into contact with the belt back face, and is heated while pressure is applied to the transfer mark material and the belt from the base material side so that the mark layer is transferred to the belt back face. Then, only the base material is removed from the belt back face.

Meanwhile, for the purpose of increasing the winding angle of the belt around the pulley for heavy duty power transmission and for the purpose of multi-pulley driving, a layout such that the belt back face as well as the belt inner periphery are brought into contact with the pulleys and a layout that power transmission is made also between the belt back face and the pulley have been increasingly adopted.

In such layouts, the above-mentioned V-ribbed belt has a problem wherein inconveniences such as abnormal noise and rubber adhesion during the belt running easily occur at that part of the belt back face on which the mark b is formed.

Thus, the mark b wears away by contact or friction with the pulleys and readily becomes unrecognizable at an early stage. If a long time passes under such a condition, it becomes difficult to track the history of belt manufacturing from the mark b.

SUMMARY OF THE INVENTION

An object of the present invention is to improve the placement of a mark indicating the history of belt manufacturing in not only power transmission belts such as a V-ribbed belt used in a manner of bringing both the belt inner periphery and the belt back face into contact with pulleys but also various kinds of belts such as a transfer belt, thereby avoiding the occurrence of inconveniences due to the mark while keeping the mark recognizable for a long time.

To attain the above object, in the present invention, a mark indicating the history of belt manufacturing is placed not on a surface of the belt in contact with pulleys, such as the belt back face, but on a surface of the belt not in contact with the pulleys, so that the occurrence of inconveniences resulting from contact or friction between the belt and the pulley is avoided while the mark can be kept recognizable for a long time.

More specifically, the present invention is directed to a belt which allows at least one of the back face, the side face and the bottom face to serve as a contact surface in contact with pulleys and is used in a manner to bring only the contact surface into contact with the pulleys.

A mark indicating the history of belt manufacturing is provided on a surface of the belt other than the contact surface.

Under the above arrangement of the invention, since the mark indicating the history of belt manufacturing is provided on a surface of the belt other than the contact surface in contact with the pulleys, that is, on a surface of the belt that causes no contact and no friction with the pulleys, this avoids the occurrence of inconveniences resulting from the placement of the mark on the contact surface as in the conventional case. Further, it can be avoided that the mark becomes unrecognizable at an early stage of use due to contact with the pulleys. This allows the history of belt manufacturing to be tracked from the mark for a long time.

In the invention, a hiding layer for hiding the texture of the belt is preferably provided on at least a part of the belt surfaces, and preferably, the mark is provided on the hiding layer.

Under the above arrangement, since the texture of the belt is hidden at least a part of the belt surfaces by the hiding layer, discrimination can be made between the hiding layer and the belt texture according to the difference in color or the like. Further, even if the mark is formed of small or fine letters, the provision of the mark on the hiding layer allows such letters to be read. Particularly, even in the case that a cord is embedded in the belt and both a rubber part and a cut end of the cord are exposed on the belt side face, the mark can be readily recognized.

Preferably, the belt is a V-ribbed belt having a plurality of ribs extending along the length of the belt on the bottom face of the belt. The V-ribbed belt is generally used for power transmission by friction on the belt bottom face where the plurality of ribs are provided, for example, when a rotational force of a crank shaft of an automobile engine is transmitted to each of auxiliaries. In addition, the V-ribbed belt has been increasingly used in a manner of bringing the belt back face into contact with pulleys such as an idler or a tensioner or performing power transmission by friction on the belt back face. Therefore, the above-mentioned effects can be practically displayed.

The belt may be a V-ribbed belt having a plurality of ribs extending along the length of the belt on each of the back and bottom faces of the belt. Further, the belt may be a raw edge belt having respective ride-out parts on the right and left side faces of the belt. Furthermore, the belt may be a synchronous belt for power transmission or transfer having a large number of tooth parts arranged in a belt lengthwise direction on the bottom face of the belt. Moreover, the belt may be a double sided synchronous belt for power transmission having a large number of tooth parts arranged in a belt lengthwise direction on each of the back and bottom faces of the belt. Further, the belt may be a flat belt for power transmission or transfer having the bottom face (inner face) and the back face (outer face) each formed into a flat surface. Also in these belts, the effects as mentioned above can be obtained.

DESCRIPTION OF PREFERRED EMBODIMENTS

Preferred embodiments of the present invention will be described below with reference to the drawings.

Figure 1:
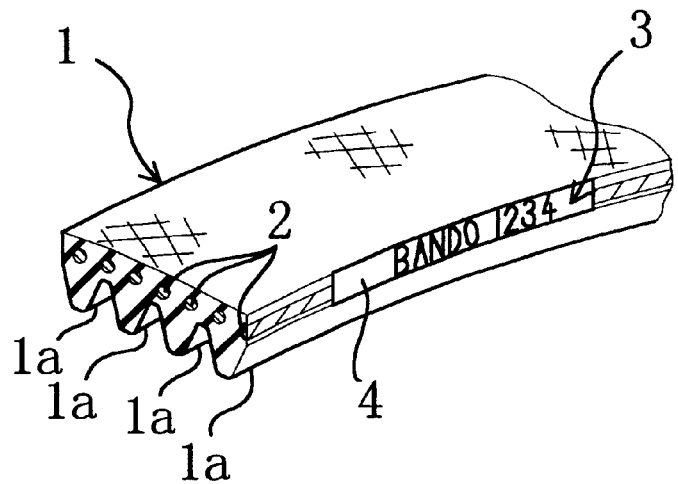
FIG. 1 is a perspective view showing a V-ribbed belt according to Embodiment 1 of the present invention.

FIG. 1 schematically shows the structure of a V-ribbed belt B according to Embodiment 1 of the invention. The belt B is used so as to be wound in a serpentine drive among a crank pulley of an engine (not shown) and a plurality of auxiliary pulleys (not shown) in an apparatus for driving auxiliaries of an automobile engine. In other words, the belt B is not placed such that the belt bottom face (belt inner periphery) is brought into contact with all the pulleys, but is placed such that the belt back face is brought into contact with a part of the pulleys.

The V-ribbed belt B has a belt body 1. On the bottom face side of the belt body 1 (lower face side of FIG. 1), there are formed a plurality of ribs 1a, 1a, . . . each extending along the length of the belt, which are arranged at uniform intervals in a belt widthwise direction and each have a V-shaped cross section. In the belt body 1, a cord 2 is embedded so as to be spirally arranged at uniform intervals in a belt widthwise direction to extend substantially along the length of the belt.

Further, in the present embodiment, the V-ribbed belt B allows the bottom face of the belt body 1 to serve as a contact surface in contact with the pulleys, and is used in a manner of bringing the bottom face (contact surface) into contact with the pulleys. Furthermore, on the side face which is a surface of the belt body 1 other than the bottom face as a contact surface in contact with the pulleys, a mark 3 indicating the history of belt manufacturing such as a manufacturer or a lot number is provided by printing or other methods using alphabets and numbers.

More specifically, a hiding layer 4 for hiding the texture of the belt is formed on a part of the side face of the belt body 1. The mark 3 is provided on the hiding layer 4. The hiding layer 4 is provided in a manner of filling the part of the belt side face with paint having a color different from the mark 3 and a high hiding property.

According to the present embodiment, in the V-ribbed belt B used in a manner of bringing the belt back face as well as the belt bottom face into contact with the pulleys, the mark 3 indicating the history of belt manufacturing is placed on the belt side face not in contact with the pulleys. This avoids the occurrence of inconveniences resulting from the formation of the mark and further keeps the mark 3 recognizable for a long time.

In addition, since the hiding layer 4 is formed on the side face of the belt body 1 and the mark 3 is provided on the hiding layer 4, the letters and numbers of the mark 3 can be read without influences of the rubber part and the cut end of the cord 2 on the belt texture.

In Embodiment 1, the hiding layer 4 is provided on a part of the side face of the belt body 1. However, the hiding layer 4 may be provided over the entire belt side face.

In Embodiment 1, the hiding layer 4 is provided on the side face of the belt body 1. However, in the case that the mark 3 can be sufficiently read without the hiding of the belt texture, for example, when the cord is not embedded or the mark 3 has larger letters, the mark 3 can be directly provided on the belt side face without using the hiding layer 4.

(Embodiment 2)

Figure 2:
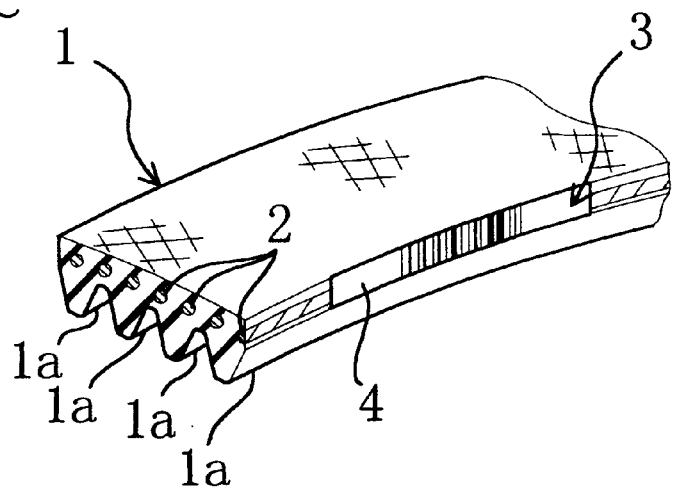
FIG. 2 is a diagram showing a V-ribbed belt according to Embodiment 2 of the present invention.

FIG. 2 shows a V-ribbed belt B according to Embodiment 2 of the invention, in which same parts as in Embodiment 1 are referred to as same reference numerals. In this embodiment, a mark 3 indicating the history of belt manufacturing is provided in the form of a bar cord. Since other structures are the same as in Embodiment 1, description is omitted. Also in Embodiment 2, the same effects as in Embodiment 1 can be displayed.

(Embodiment 3)

Figure 3:
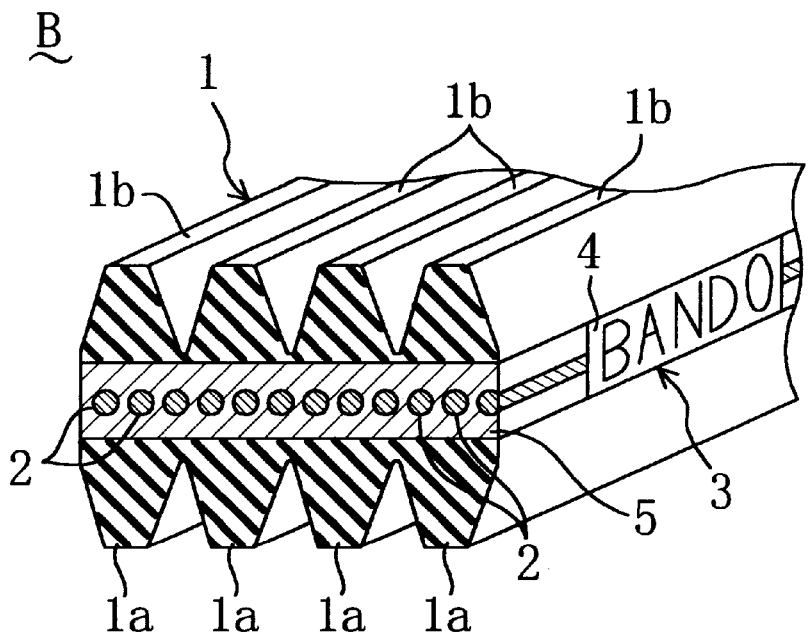
FIG. 3 is a diagram showing a double sided V-ribbed belt according to Embodiment 3 of the present invention.

FIG. 3 shows Embodiment 3 of the invention, in which the invention is applied to a double sided V-ribbed belt B. In this embodiment, on the belt bottom face side (belt inner peripheral side) of the belt body 1, there are formed, similarly to Embodiment 1, a plurality of bottom face-side ribs 1a, 1a, . . . each extending along the length of the belt, which are arranged at uniform intervals in a belt widthwise direction and each have a V-shaped cross section. Also on the belt back face side (belt outer peripheral side), a plurality of back face-side ribs 1b, 1b, . . . are similarly formed. The back face-side ribs 1b, 1b, . . . and the bottom face-side ribs 1a, 1a, . . . are formed in a corresponding manner between the upper and lower positions. Reference numeral 5 indicates an adhesion rubber layer in which a cord 2 is embedded.

The double sided V-ribbed belt B of this embodiment allows the back face as well as the bottom face of the belt body 1 to serve as contact surfaces in contact with the pulleys, and therefore is used in a manner of bringing the bottom and back faces (both contact surfaces) into contact with the pulleys. Similarly to Embodiment 1, a mark 3 indicating the history of belt manufacturing is provided on a belt side face which is a surface other than the belt bottom and back faces as contact surfaces, by printing or other methods using alphabets and numbers (or a bar cord). Accordingly, also in the double sided V-ribbed belt B of this embodiment, the same effects as in Embodiment 1 can be displayed.

(Embodiment 4)

Figure 4:
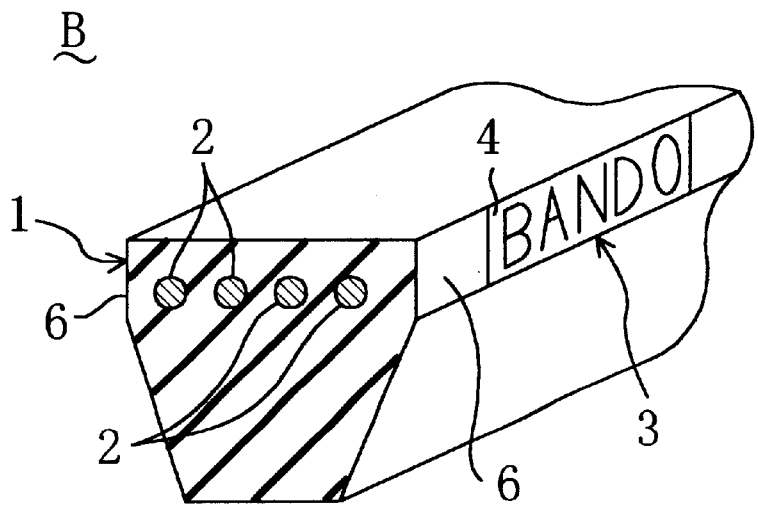
FIG. 4 is a diagram showing a raw edge V-belt according to Embodiment 4 of the present invention, having a mark placement which corresponds to FIG. 1.

FIG. 4 shows Embodiment 4 of the invention, in which the invention is applied to a raw edge V-belt B. The raw edge V-belt has a substantially V-shaped cross section, and is provided with a pair of ride-out parts 6, 6 extending in parallel with each other in a direction of the belt thickness at back face-side parts of the right and left side faces of the belt body 1. The raw edge V-belt B allows parts of the right and left side faces of the belt body 1 other than the ride-out parts 6, 6 to serve as contact surfaces in contact with the pulleys, and is used in a manner of bringing the parts (contact surfaces) of the side faces into contact with the pulleys. On the ride-out parts 6, 6 not corresponding to the contact surfaces of the right and left side faces, a mark 3 indicating the history of belt manufacturing is provided by printing or other methods using alphabets, numbers or a bar cord. Accordingly, also in the raw edge V-belt of this embodiment, the same effects as in Embodiment 1 can be displayed.

(Embodiment 5)

Figure 5:
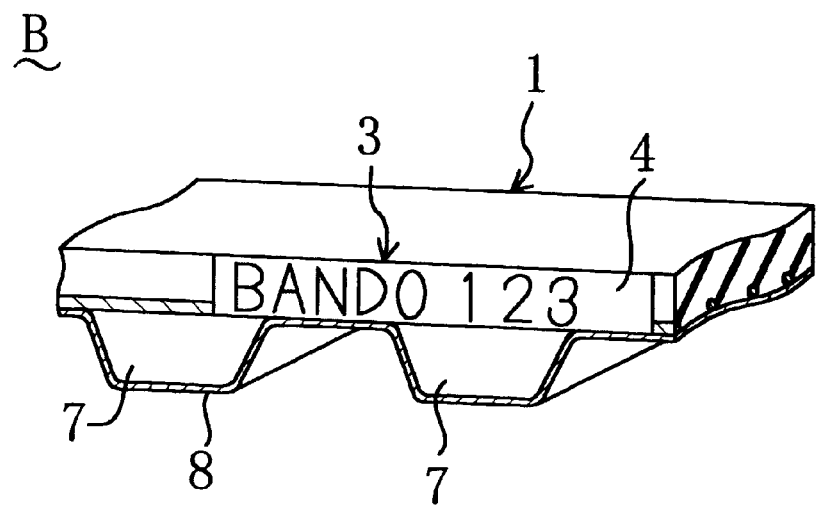
FIG. 5 is a diagram showing a synchronous belt according to Embodiment 5 of the present invention.

FIG. 5 shows Embodiment 5 of the invention, in which the invention is applied to a synchronous power transmission belt B used for driving a cam shaft of an OHC engine. On the bottom face side (inner peripheral side) of the belt body 1 of the synchronous belt B, a large number of tooth parts 7, 7, . . . are formed so as to be arranged at uniform intervals in a belt lengthwise direction. The tooth parts 7, 7, . . . are covered with a facing fabric 8. The synchronous belt B allows the bottom face to serve as a contact surface in contact with synchronous pulleys and is used in a manner of bringing the bottom face (contact surface) into contact with the pulleys. A mark 3 indicating the history of belt manufacturing is provided on the belt side face (or belt back face) which is a surface other than the belt bottom face as the contact surface, by printing or other methods. Accordingly, also in the synchronous belt B of this embodiment, the same effects as in Embodiment 1 can be displayed.

When the synchronous belt B of this embodiment is used in a winding manner that the back face thereof comes into contact with a tension pulley or the like, the belt back face serves as a contact surface in contact with the pulley. Therefore, in such a case, the mark 3 is formed only on the belt side face which is a surface of the belt other than the back face as the contact surface.

In Embodiment 5, the invention is applied to a synchronous power transmission belt for driving a cam shaft of an OHC engine. However, the present invention may be applied to a synchronous transfer belt.

Also to a double sided synchronous belt in which tooth parts 8, 8, . . . similar to those provided on the bottom face are provided on the back face, the present invention can be applied. In this case, the mark 3 may be formed only on the belt side face which is a surface other than the belt back and bottom faces.

(Embodiment 6)

Figure 6:
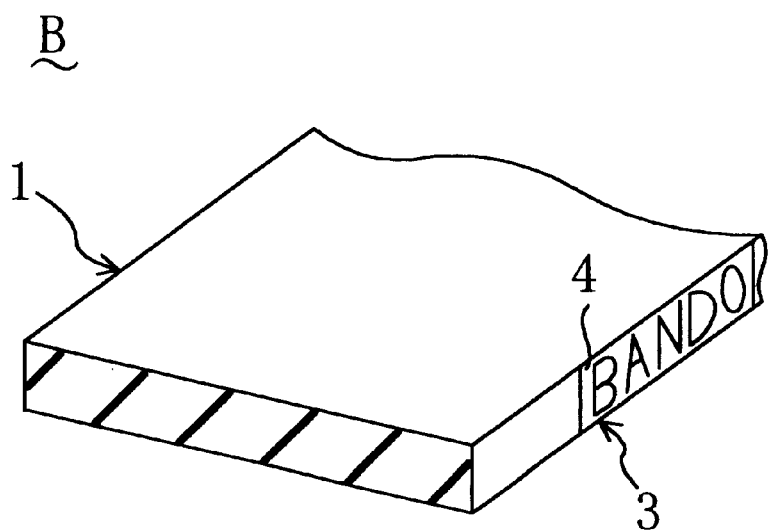
FIG. 6 is a diagram showing a flat belt according to Embodiment 6 of the present invention.
Figure 7:
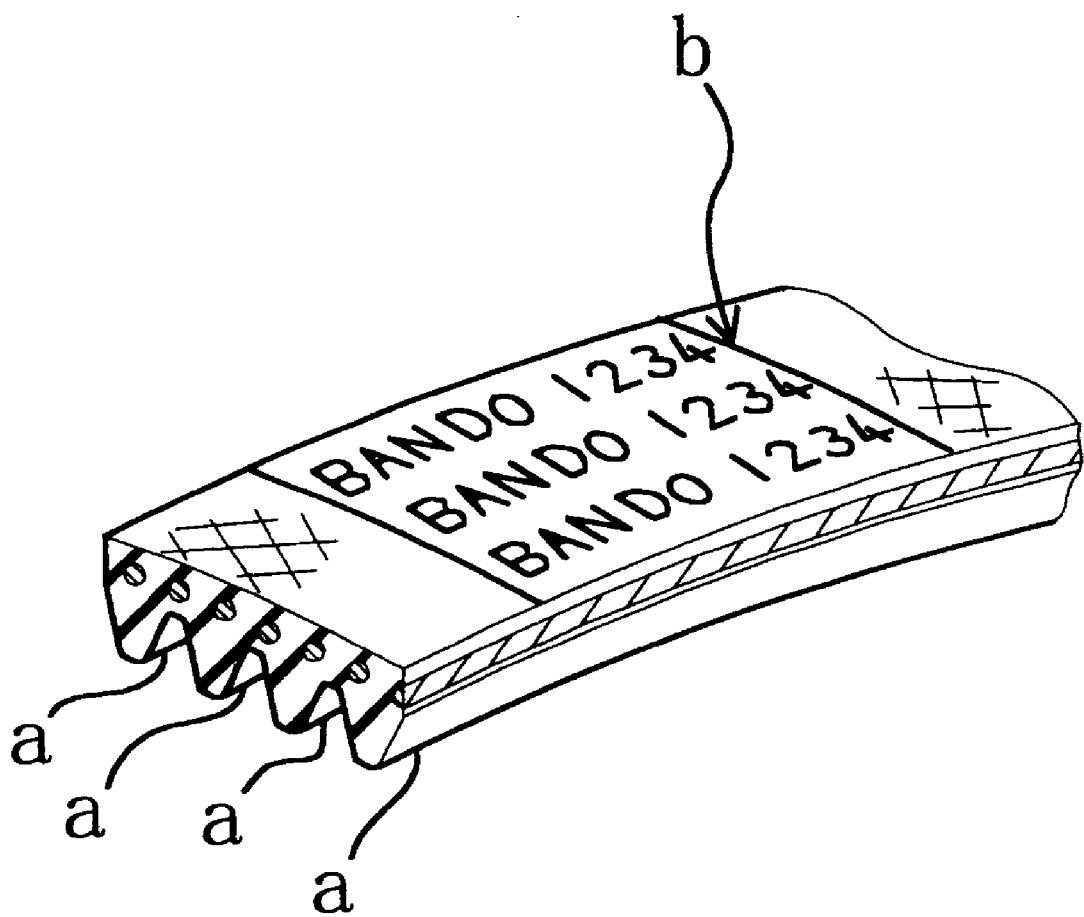
FIG. 7 is a diagram showing a conventional V-ribbed belt

FIG. 6 shows Embodiment 6 of the invention, in which the invention is applied to a flat belt B. The flat belt B has the bottom face (inner face) and back face (outer face) of the belt body 1 respectively formed into flat surfaces, and allows the bottom face to serve as a contact surface in contact with flat pulleys. The flat belt B is used in a manner of bringing the bottom face (contact surface) into contact with the flat pulleys. A mark 3 indicating the history of belt manufacturing is provided on the belt side face or back face which is a surface of the belt other than the belt bottom face serving as the contact surface, by printing or other methods. Accordingly, also in the flat belt of this embodiment, the same effects as in Embodiment 1 can be displayed.

When the flat belt B of this embodiment is used in a winding manner that the back face thereof also comes into contact with the flat pulley, the belt back face also serves as a contact surface in contact with the pulley. Therefore, in such a case, the mark 3 is formed only on the belt side face which is a surface of the belt other than the belt back face as the contact surface.

In Embodiment 6, the invention is applied to a flat power transmission belt. However, the present invention may be applied to a flat transfer belt.

The present invention is not restricted to the above-mentioned embodiments and can be also applied to various kinds of belts other than the above. In short, a mark 3 can be provided anywhere on surfaces of the belt other than a contact surface in contact with pulleys.

What is claimed is:

1. A power transmission belt comprising:

a back face;

at least one side face having a non-contact portion;

a bottom face, wherein at least one of the back face and the bottom face form at least one contact surface in contact with pulleys to drive the belt, and an identifying mark indicating the history of the belt manufacturing disposed on the non-contact portion of the at least one side face.

2. A belt according to claim 1, wherein the at least one contact surface is the bottom face of the belt.

3. A belt according to claim 1, wherein the at least one contact surface comprises the bottom face and the back face of the belt.

4. A belt according to claim 1, wherein the identifying mark is an alphanumeric mark which indicates the manufacturer and lot number of the belt.

5. A belt according to claim 1, further comprising a hiding layer for hiding a texture of the belt provided on at least a part of the non-contact portion, and wherein the identifying mark is provided on the hiding layer.

6. A belt according to claim 2, wherein the belt is a V-ribbed belt having a plurality of ribs extending along a length of the belt on the bottom face of the belt.

7. A belt according to claim 3, wherein the belt is a V-ribbed belt having a plurality of ribs extending along a length of the belt on each of the back and bottom faces of the belt.

8. A belt according to claim 1, wherein the belt is a raw edge belt having respective right and left side faces and the non-contact portion of the at least one side face is formed by a ride-out part located on each of the right and left side faces of the belt.

9. A belt according to claim 2, wherein the belt is a synchronous belt for power transmission or transfer having a large number of tooth parts arranged in a belt lengthwise direction on the bottom face of the belt.

10. A belt according to claim 3, wherein the belt is a double sided synchronous belt for power transmission having a large number of tooth parts arranged in a belt lengthwise direction on each of the back and bottom faces of the belt.

11. A belt according to claim 3, wherein the belt is a flat belt for power transmission or transfer having the back and bottom faces each formed into a flat surface.

* * * * *